US 9,037,500 B2

(12) United States Patent
Abhari et al.

(10) Patent No.: US 9,037,500 B2
(45) Date of Patent: *May 19, 2015

(54) METHOD, MEDIUM, AND SYSTEM OF GENERATING A REFERRAL WEBSITE URL USING WEBSITE LISTINGS IN A COOKIE

(75) Inventors: Hassan (Al) Abhari, Saratoga, CA (US); Siew (Roland) T. Chow, Sunnyvale, CA (US)

(73) Assignee: ACADEMIXDIRECT, INC., Mountain View, CA (US)

( * ) Notice: Subject to any disclaimer, the term of this patent is extended or adjusted under 35 U.S.C. 154(b) by 571 days.

This patent is subject to a terminal disclaimer.

(21) Appl. No.: 13/327,713

(22) Filed: Dec. 15, 2011

(65) Prior Publication Data

US 2012/0089460 A1 Apr. 12, 2012

Related U.S. Application Data

(63) Continuation of application No. 12/437,516, filed on May 7, 2009, now Pat. No. 8,082,187.

(60) Provisional application No. 61/051,314, filed on May 8, 2008.

(51) Int. Cl.
*G06Q 30/00* (2012.01)
*G06Q 30/02* (2012.01)
*G06Q 30/06* (2012.01)

(52) U.S. Cl.
CPC ............ *G06Q 30/02* (2013.01); *G06Q 30/0214* (2013.01); *G06Q 30/0251* (2013.01); *G06Q 30/0255* (2013.01); *G06Q 30/0631* (2013.01)

(58) Field of Classification Search
USPC .......................... 705/26.1, 26.7, 14.49, 27.1
See application file for complete search history.

(56) References Cited

U.S. PATENT DOCUMENTS

| | | | |
|---|---|---|---|
| 5,537,618 A | 7/1996 | Boulton et al. | |
| 6,189,030 B1* | 2/2001 | Kirsch et al. | 709/224 |
| 6,466,966 B1* | 10/2002 | Kirsch et al. | 709/203 |
| 6,826,594 B1* | 11/2004 | Pettersen | 709/203 |
| 8,082,187 B2 | 12/2011 | Abhari et al. | |
| 2002/0128959 A1* | 9/2002 | Kostic et al. | 705/37 |
| 2003/0195837 A1* | 10/2003 | Kostic et al. | 705/37 |
| 2005/0010472 A1 | 1/2005 | Quatse et al. | |
| 2005/0065881 A1* | 3/2005 | Li et al. | 705/40 |

(Continued)

FOREIGN PATENT DOCUMENTS

WO 9849641 11/1998

OTHER PUBLICATIONS

Electronic commerce: Web-based businesses are booming Powell, Edwin Office Systems, v15n9, p. 12-15, Sep. 1998.*
David A. Aaker, V. Kumar, and GeorgeS. Day; Marketing Research; 7th Edition; Published 2000 by John Wiley and Sons; pp. 639-642, 648-653, 665-679, 694-704.

(Continued)

*Primary Examiner* — Matthew Zimmerman
(74) *Attorney, Agent, or Firm* — Greenberg Traurig LLP

(57) ABSTRACT

A closed loop referral system and method is disclosed. According to one embodiment, a computer-implemented method, comprises embedding a tracking code into a first website. The tracking code communicates with a referral system. A user interface is provided on a browser for the first website. The browser is directed from the first website to a second website. Upon performance of a user action on the second website, the tracking code is executed. The tracking code communicates with the referral system to direct the browser to a third website determined by the referral system.

17 Claims, 6 Drawing Sheets

(56) References Cited

U.S. PATENT DOCUMENTS

| | | |
|---|---|---|
| 2005/0097204 A1* | 5/2005 | Horowitz et al. ............. 709/223 |
| 2007/0233561 A1 | 10/2007 | Golec |
| 2008/0097871 A1* | 4/2008 | Williams et al. ................ 705/26 |
| 2009/0012852 A1* | 1/2009 | O'Kelley et al. ................ 705/14 |
| 2009/0281852 A1 | 11/2009 | Abhari et al. |
| 2013/0046581 A1 | 2/2013 | Onder et al. |

OTHER PUBLICATIONS

Edward Nash; Direct Marketing: Strategy, Planning, Innovation; 4th Edition; Published Jan. 21, 2000 by McGraw-Hill; pp. 148-157, 178-213,364-375,512-513.

Valery Nicholas; "Innovation in Industry: Leaps of Faith"; Published Feb. 20, 1999 by the Economist Intelligence Unit; The Economist vol. 350.8107; pp. S14-S18.

* cited by examiner

METHOD, MEDIUM, AND SYSTEM OF GENERATING A REFERRAL WEBSITE URL USING WEBSITE LISTINGS IN A COOKIE

CROSS REFERENCE TO RELATED APPLICATIONS

The present application is a continuation application of U.S. patent application Ser. No. 12/437,516, filed May 7, 2009, which claims the benefit of and priority to U.S. Provisional Patent Application Ser. No. 61/051,314 filed May 7, 2008, the disclosures of which applications are hereby incorporated by reference.

FIELD

The field of the invention relates generally to computer systems and more particularly relates to a closed loop referral system.

BACKGROUND

In the era of the Internet, online marketing has become a powerful tool for promoting products and services in an online market that has never existed in the paper age. In order to maximize their exposure to online users, online advertisers use various techniques. Online merchants may pay to place their products and services on the search result page to enhance their exposure at their own cost.

Another technique of online marketing utilizes a website to attract users by providing useful information. When a user visits the website, the user may be directly or indirectly provided with advertising materials. The more users visit the website, the more valuable the website becomes to the advertisers. Even better is that a new user visiting the website registers with the service of the website and provides personal information such as his/her age, residence, personal interests, etc. Such personal information may be used to provide more focused advertising to the user, therefore online advertisers usually value a registered user higher than an anonymous user.

An online referral system directs its clients to other affiliated websites and generates revenue based on the frequencies and quality of the referrals. For example, the total number of clients referred from a website to an affiliated website may be used to calculate the referral fee basis. The number of successfully registered clients as a result of referral may be valued higher than a non-registered referral. Typically, referral fees are based on a contract between the referring party and the referred party. Tracking the number of the referred clients is important to correctly calculate the referral fees.

SUMMARY

A closed loop referral system and method is disclosed. According to one embodiment, a computer-implemented method, comprises embedding a tracking code into a first website. The tracking code communicates with a referral system. A user interface is provided on a browser for the first website. The browser is directed from the first website to a second website. Upon performance of a user action on the second website, the tracking code is executed. The tracking code communicates with the referral system to direct the browser to a third website determined by the referral system.

The above and other preferred features, including various novel details of implementation and combination of elements will now be more particularly described with reference to the accompanying drawings and pointed out in the claims. It will be understood that the particular methods and apparatus are shown by way of illustration only and not as limitations. As will be understood by those skilled in the art, the principles and features explained herein may be employed in various and numerous embodiments.

BRIEF DESCRIPTION OF THE DRAWINGS

The accompanying drawings, which are included as part of the present specification, illustrate the presently preferred embodiment of the present invention and together with the general description given above and the detailed description of the preferred embodiment given below serve to explain and teach the principles of the present invention.

Figure 1:
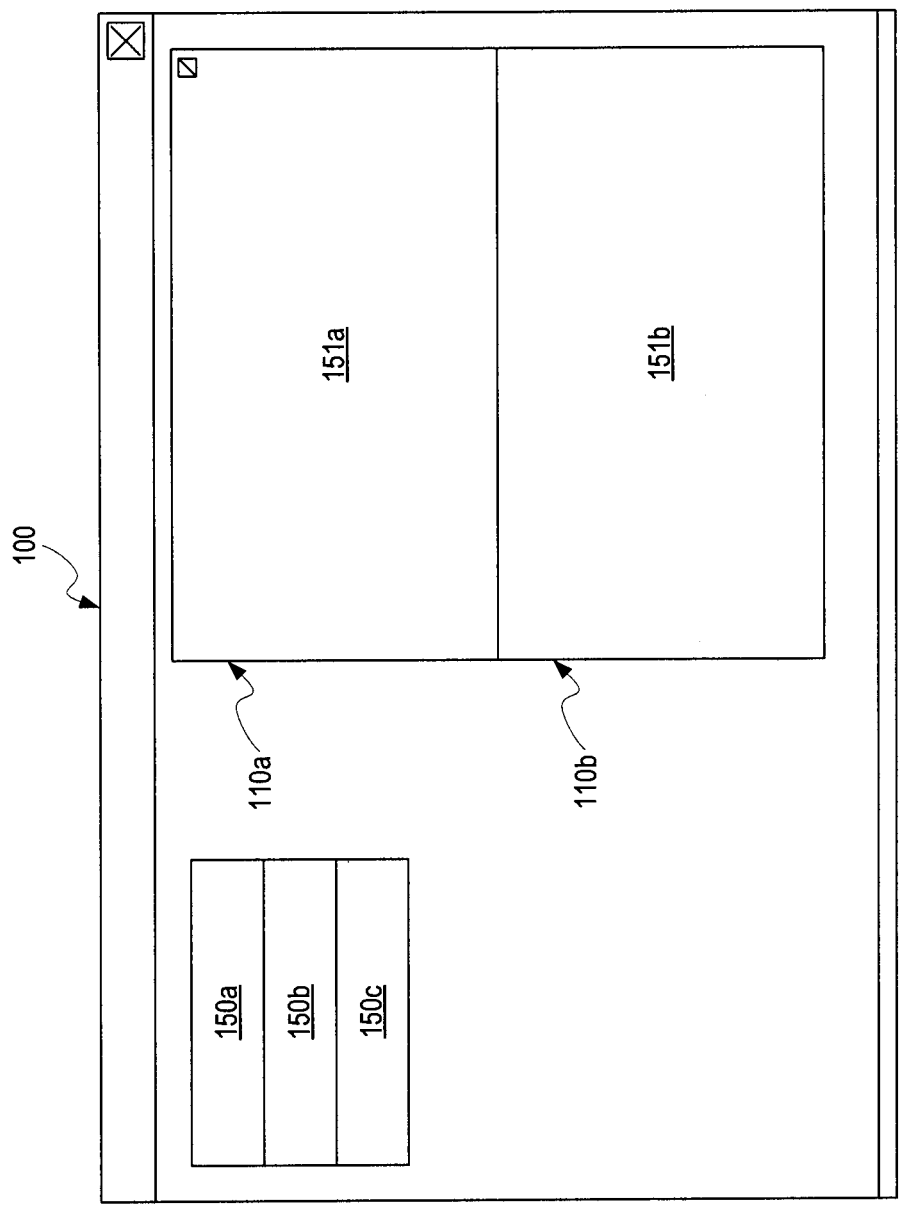
FIG. 1 illustrates an exemplary webpage of a closed-loop referral system, according to one embodiment.

It should be noted that the figures are not necessarily drawn to scale and that elements of similar structures or functions are generally represented by like reference numerals for illustrative purposes throughout the figures. It also should be noted that the figures are only intended to facilitate the description of the various embodiments described herein. The figures do not describe every aspect of the teachings described herein and do not limit the scope of the claims.

DETAILED DESCRIPTION

A closed loop referral system and method is disclosed. According to one embodiment, a computer-implemented method, comprises embedding a tracking code into a first website. The tracking code communicates with a referral system. A user interface is provided on a browser for the first website. The browser is directed from the first website to a second website. Upon performance of a user action on the second website, the tracking code is executed. The tracking code communicates with the referral system to direct the browser to a third website determined by the referral system.

In the following description, for the purposes of explanation, specific nomenclature is set forth to facilitate an understanding of the various inventive concepts disclosed herein. However, it will be apparent to one skilled in the art that these specific details are not required in order to practice the various inventive concepts disclosed herein.

The present system and method also relates to apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but is not limited to, any type of device including flash memory devices, floppy disks, optical disks, CD-ROMs, and magnetic-optical disks, read-only memories, random access memories, EPROMs, EEPROMs, magnetic or optical cards, or any type of media suitable for storing electronic instructions, and each coupled to a computer system bus.

The methods presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

The present system and method may be used in various embodiments and applications. In order to illustrate the usage and benefits of the present system and method, the following use cases are disclosed. However, it is appreciated that the present system and method may be applied in a variety of ways and conditions, and the following exemplary use cases are not understood to limit the scope of the present subject matter.

FIG. 1 illustrates an exemplary webpage of a closed-loop referral system, according to one embodiment. The closed-loop referral system provides a mechanism for redirecting users to any designated location instructed by the closed-loop referral system after directing the users to external websites 151. An external website 151 herein refers to any website that can reached from webpage 100 via a network. Links 150 to external websites 151 may appear on webpage 100 as hyperlinks or clickable or actionable web objects such as flash banners, images, hover areas, etc. Alternatively, each external website 151 may appear in a frame 110 of webpage 100. In the latter case, the closed-loop referral system renders external website 151 *a* as a part of the webpage 100 because the external website 151*a* appears to be embedded on webpage 100 through frame 110*a*. It is appreciated that the links 150 to external websites 151 may appear in a variety of manners achievable with the current web technology, thus are not limited to the present examples.

Webpage 100 may be hosted by a third party. Each external website 151 may be provided with a tracking code 255. When a user leaves website 151*a*-*b*, the user's web browser can be redirected to a designated website. After the user leaves webpage 100 to view a webpage of an external website 151, the user's web browser does not lose its connection with the closed-loop referral system. Tracking code 255 allows the closed-loop referral system to retain a connection with the user's web browser in a closed-loop after the user leaves webpage 100.

Figure 2A:
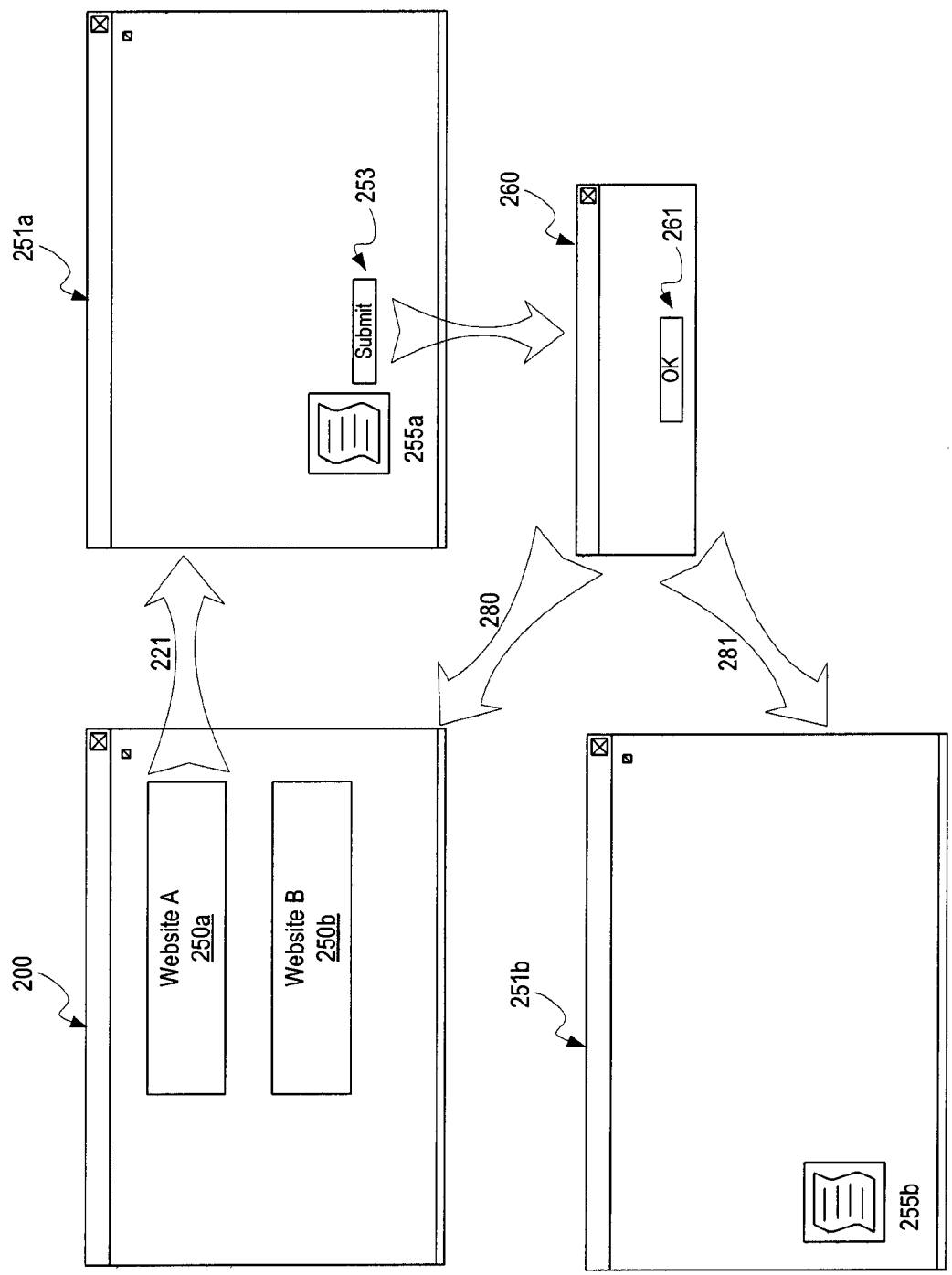
FIG. 2A illustrates an exemplary block diagram of a closed-loop referral system, according to one embodiment.

FIG. 2A illustrates an exemplary block diagram of a closed-loop referral system, according to one embodiment. Using a web browser, a user visits a webpage 200. Webpage 200 includes one or more links 250 to external websites 251. Upon clicking on link 250*a*, the user's web browser loads external website 251*a* as indicated by a symbolic arrow 221. The user views and interacts with website 251*a*. After performing an action while on website 251*a* (e.g., filling out a form), tracking code 255*a* is loaded. For example, a "submit" button 253 on website 251*a* is pressed to load tracking code 255. In another example, the user hovers the mouse cursor on an actionable web object to load tracking code 255. It is appreciated any action can be programmed and linked to load and execute tracking code 255.

In response to a user action, tracking code 255*a* communicates with the closed-loop referral system to perform one or more operations based upon parameters provided by the closed-loop referral system. The parameters may include information such as personal information of the user, the webpage 200 that the user initially visits, the website 251*a* that the user visits by selecting link 250*a*, and the type of action to perform upon performance of a user action. The parameters are provided by the closed-loop referral system that stores them in a cookie that is transmitted to the user's computer. The cookie may be transmitted when the user clicks on the link 250*l*. While visiting website 251*a*, a particular user action may also generate new parameters dynamically that may be used to determine the next website (e.g., webpage 200, website 251*b*) to redirect the user's browser. Using the present system, the connection between the user's web browser and the closed-loop referral system is maintained.

According to one embodiment, once a user takes an action on webpage 251*a* (e.g., clicking the "submit" button 253), the user is presented with a confirmation page 260. Confirmation page 260 may also allow the closed-loop referral system to receive a message (e.g., thank you message) to be displayed to the user. After the user clicks the "OK" button 261, the user is redirected back to webpage 200. In another embodiment, the user's web browser is redirected to another external website 251*b*. Tracking code 255*a* may be loaded and executed when the user clicks the "OK" button 261 instead of the "submit" button 253. It is noted that confirmation page 260 is optional and tracking code 255*a* may be loaded without using a confirmation page 260.

According to one embodiment, a tracking code 255 is embedded in each of the external websites 251 such that the user's specific action (e.g., click on the "OK" button on the confirmation page 260, hovering over a web object) triggers the execution of the tracking code. According to another embodiment, the tracking code 255 is stored on a remote server (e.g. the web server of the closed-loop referral system) accessible from the external website 251. The tracking code 255 reads the redirection parameters stored in the cookie on the user's computer and guides the browser to direct the user to a designated website. The user may be directly sent to another website 251*b* without returning to the website 200 as specified by the redirection parameters of the closed-loop referral system.

When a user leaves webpage 200, the user's browser is redirected to the closed-loop referral system. The closed-loop referral system provides a cookie including one or more ID numbers to the user's computer. After the cookie is transmitted to the user's computer, the closed-loop referral system redirects the user's browser to webpage 251*a*. When the user takes an action on webpage 251*a*, the tracking code 255 that is either embedded in webpage 251*a* or exists in webpage 251's server environment is loaded. Once the tracking code 255 is loaded, the system reads the cookie on the user's computer, and searches its database to match the corresponding ID numbers from the cookie to take certain actions, such as redirecting the user's browser to another webpage 251*b*. The tracking code 255 may also invoke a time delay or prompt a download or installation.

The tracking code enables a user who has left a website to return to the website or be redirected to a designated website by the closed-loop referral system. Without the closed-loop referral system, the user would be left in the next website's control, and the user is not shown additional advertisements as the advertiser of website 100 or the closed-loop referral system intends.

Figure 2B:
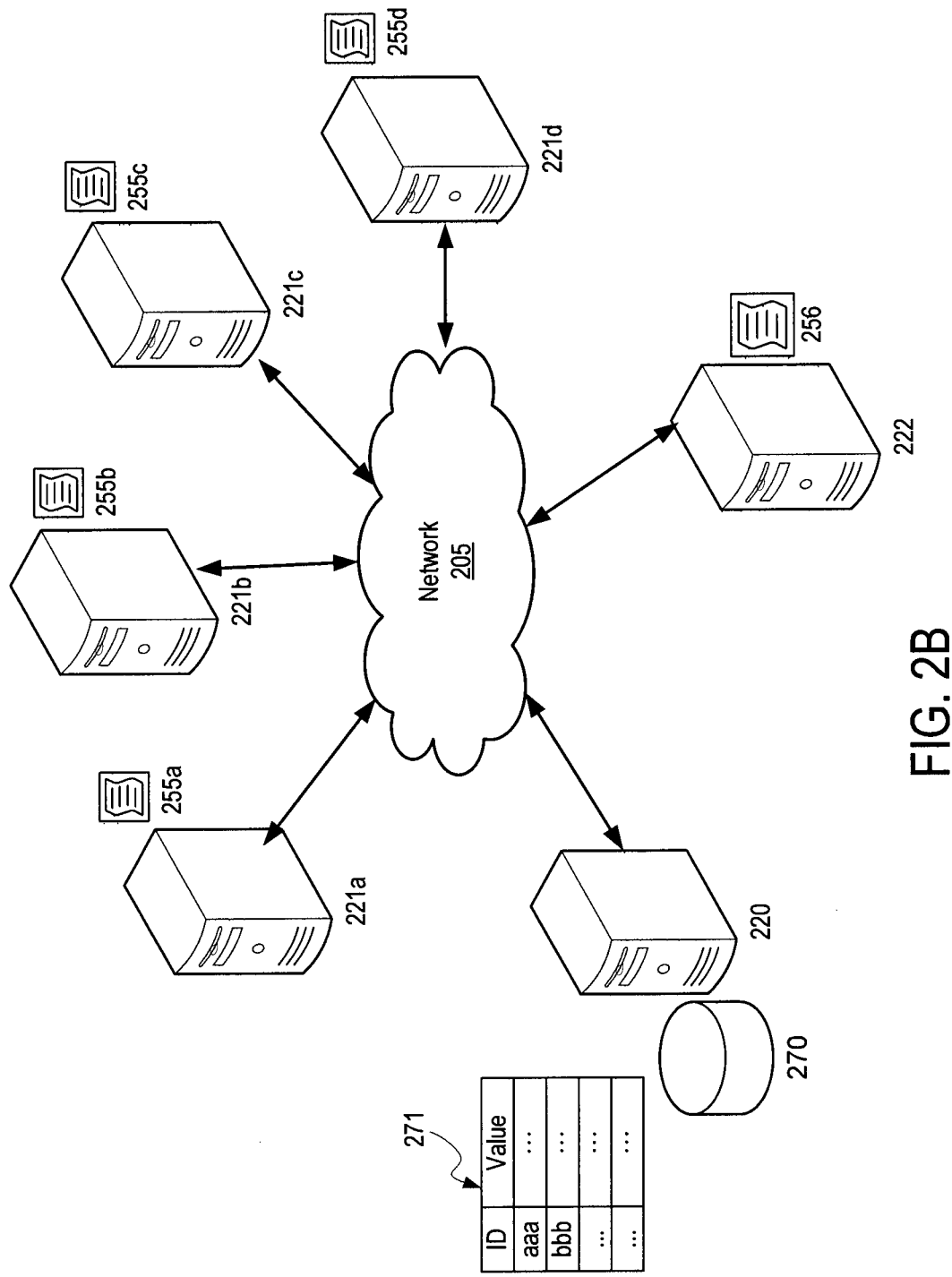
FIG. 2B illustrates an exemplary network diagram of a closed-loop referral system, according to one embodiment.

FIG. 2B illustrates an exemplary network diagram of a closed-loop referral system, according to one embodiment. Closed-loop referral system 220 contains a database 270 that stores ID table 271. ID table 271 includes a mapping of ID numbers to particular information. For example, an ID number may map to a user's name, a URL, a particular advertising campaign, or similar information. An ID number may also map to a series of operations that are to be performed by closed-loop referral system 220, websites 221, and user computer 222. Database 270 also stores user account information, user habit data, campaign IDs, partner IDs, website URLs, etc. ID table 271 may be used to link ID numbers with URLs, names, and/or values. For example, tracking code 255a communicates with closed-loop referral system to exchange ID numbers to perform an operation (e.g., redirect the user's browser to a website). Closed-loop referral system 220 is linked to external websites 221a-d and a user's computer 222 via network 205. Webpage 200 may be hosted on any of the external websites 221a-d or by closed-loop referral system 220. Each of the external websites 221a-d includes tracking code 255 that communicates with closed-loop referral system 220 when directing a user's web browser to an external website 221. For example, when a user's web browser is directed from website 221a to website 221b, a cookie is dropped on the user's computer 222 that stores the ID numbers of both the websites 221a and 221b. The tracking code 225b of website 221b communicates with closed-loop referral system 220 to identify ID numbers in cookie 256. The ID numbers may be used to generate a URL that is associated with the closed-loop referral system 220. The closed-loop referral system 220 interprets the parameters provided in the URL to determine an appropriate operation to perform such as to direct the user's browser to a particular website.

The user's personal interests and habits may be monitored and analyzed by the closed-loop referral system 220 over time and by tracking various locations that the user visits. The next time the user revisits the website 200, the closed-loop referral system 220 provides advertisements customized for the specific user.

Closed-loop referral system may be used for various applications. According to one embodiment, the closed-loop referral system is used with a video rental site. The video rental website 200 may offer various free online movies from affiliated online video rental sites such as Blockbuster and Netflix. The affiliated businesses embed a tracking code in their websites to redirect the user to the originating website. For example, a user clicks on the Blockbuster advertisement on webpage 200 and is directed to Blockbuster's website 251a. After completing a free trial form, the user is prompted with a confirmation page 260. By clicking the "OK" button 261, the user is redirected to the next video rental site 251b that offers an alternative rental service program, for example, Netflix. The tracking code embedded in Blockbuster's website communicates with closed-loop referral system to identify the next web location (e.g. netflix.com). Tracking code 255 may contain a pre-specified web location or dynamically query the closed-loop referral system 220 to download the next web location such that the closed-loop referral system 200 retains control of the user's navigational experience.

According to another embodiment, the closed-loop referral system is used with an education portal site. The education portal site may offer a search feature tailored to a specific user's need. For example, a user may wish to find vocational schools in a particular geographical area Links to each vocational school 251, found as a result of the search, appear on the main webpage 200. If the user is interested in knowing more about a school appearing on the webpage 200, the user clicks on the link 251 and is directed to the school's webpage, for example webpage 251a. The user fills in the registration form to receive more information about the school's program or complete the online registration. After completing the registration form on webpage 251a, the user is prompted with a confirmation page 260. Confirmation page 260 includes an "OK" button. By clicking the "OK" button, the user may initiate communication between the tracking code and the closed-loop referral system that directs the user's web browser to webpage 251b of the next school in the queue. The user may perform a registration process for the next school.

Figure 3:
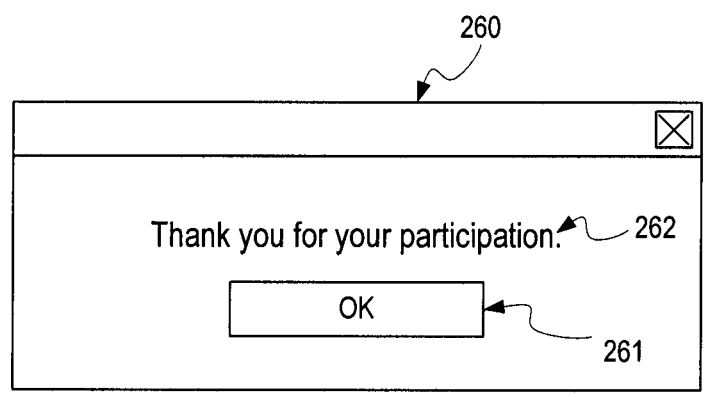
FIG. 3 illustrates an exemplary confirmation page, according to one embodiment.

FIG. 3 illustrates an exemplary confirmation page, according to one embodiment. A user redirected from an originating webpage 200 fills in a web form and submits it. The user is then prompted with a confirmation page 260 that has an embedded code, for example: <script src="http://www.yourdomain.com/thankyoupage"></script>. The script "thankyoupage" on "www.yourdomain.com" is loaded and executed. This may be initiated upon a particular user action (e.g., clicking the "OK" button 261, hovering, filling a form) or may be initiated once the confirmation page 260 is loaded. The message 262 may be retrieved by tracking code 255 from closed-loop referral system 220. The user is directed to the next website as identified by closed-loop referral system 220 communicating with tracking code 255.

According to one embodiment, parameters are stored in a cookie that the closed-loop referral system provides to the user's computer. The parameters are passed to tracking code 255 upon a particular user action (e.g., the user's successful completion of a form) on the directed website.

For example, the redirection parameters are stored as a uniform resource locator (URL), http://www.thesystem.com/aaa/bbb/ccc/ddd/eee/fff, where "thesystem.com" is the domain name of the closed-loop referral system 220; aaa is the type of action (e.g., thankyoupage, etc.); bbb is an ID number of the site name that the user came from (e.g., www.blockbuster.com, www.netflix.com); ccc is a user ID (e.g., to track user information such as name, etc.); ddd is a site ID (e.g., a site to send the user to after completing an action); eee is a campaign ID (e.g., America Online as an advertiser or an identifier of a referral publisher, what campaign was running to get user to the system, etc.); and fff is a tracking ID (e.g., a tracking identifier, the particular ad group within the publisher, or tracking of a keyword, impressions, publisher sites, video objects, phone numbers generated, click-to-call action items, etc.). It is appreciated that other redirection parameters may be used to achieve efficient and useful exchange of data between the user's computer and the closed-loop referral system, and thus are not limited to the present examples.

Figure 4:
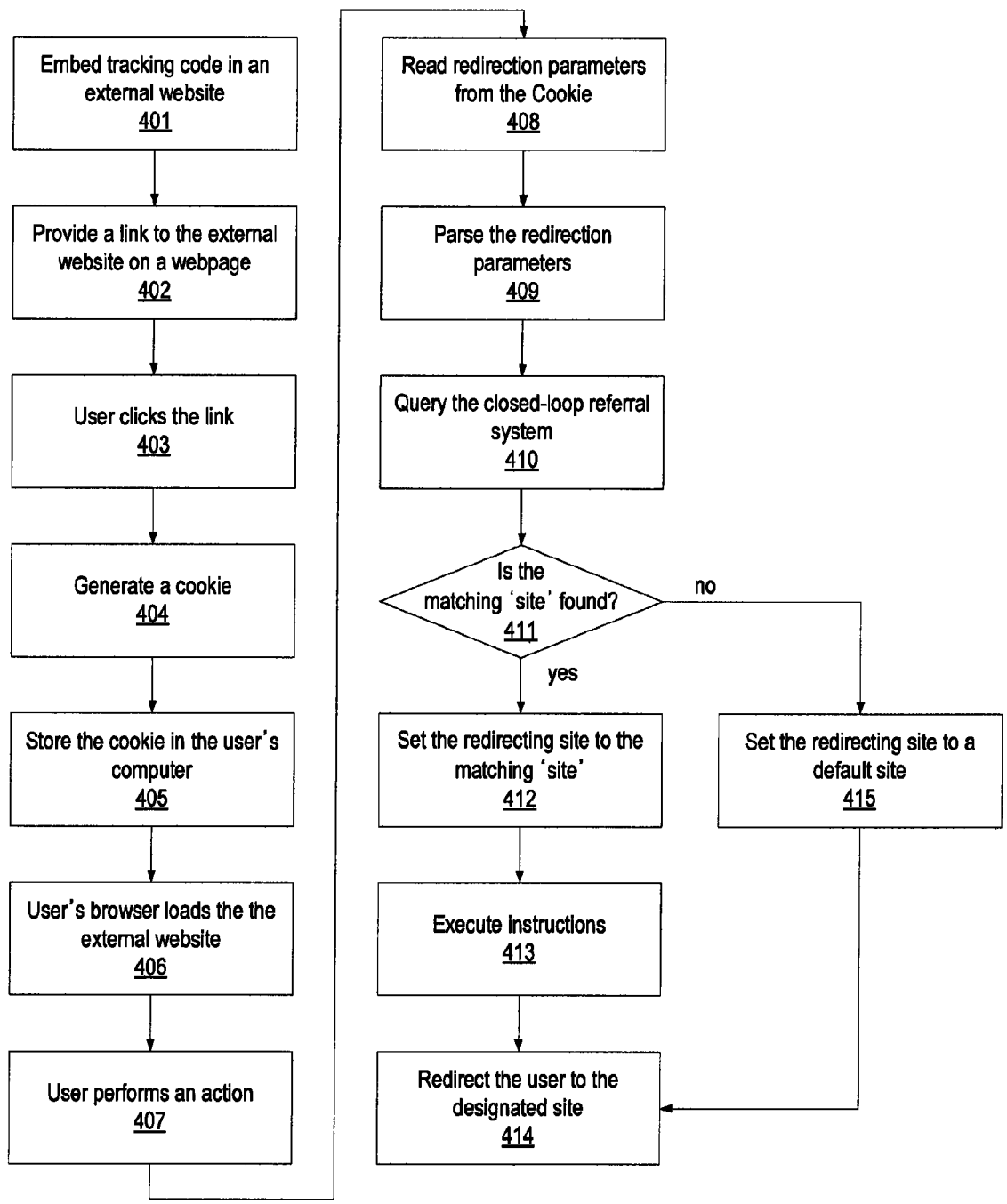
FIG. 4 illustrates an exemplary redirection process using a tracking code, according to one embodiment.

FIG. 4 illustrates an exemplary browser redirection process using a tracking code, according to one embodiment. Tracking code 255 is embedded in an external website 221 (401). The tracking code 255 is capable of communicating with closed-loop referral system 220. A link to an external website 221 is provided on a webpage (402). The webpage may include many links to external websites 221. A user clicks a link on external webpage 221 (403). Upon, clicking the link, closed-loop referral system 220 generates a cookie 256 and transmits it to the user's computer 222 (404). The cookie 256 is stored on the user's computer 222 and is later used by the tracking code 255 to identify the next website (405). After the cookie 256 is stored, the user's web browser loads the external website 221 that also has embedded tracking code 255 (406). The user may perform an action that executes tracking code 255 (407).

The parameters (e.g., aaa/bbb/ccc/ddd/eee/fff) stored in cookie 256 are used by tracking code 255 (408). The tracking code 255 parses the parameters (409). The tracking code 255 examines the parameter "bbb", (e.g., the ID number of a particular website), and queries the closed-loop referral system 220 to find a match (410). If a matching ID number for the parameter "bbb" is found (411), the cookie variable 'siteuid' is set to "ccc," (412) which is the 'user ID.' If there is no matching ID number corresponding to the parameter "bbb," the redirecting site is set to a default site (415) or any other designated website such that the closed-loop referral system maintains control of the user's web browser. The default site may then update the user's cookie with additional parameters, accordingly. Tracking code 255 may implement any logic to execute a set of instructions (413). The user is redirected to the designated website (414).

The closed-loop referral system allows the referring site to stay in control of a user who might be directed to another website. Referring to FIG. 1, a third party's website 151a is embedded into website 100 in a framed environment. A user interacts with the third party's website 151 a without leaving website 100 because the website is embedded in website 100 in frame 101a. The user may select other websites 151b-e on website 100 anytime even during the interaction with the currently active website 151a.

When frame 110 loads a third party's website, the following actions take place in conjunction with loading the third party's website. A redirect URL may be created where the domain name of the master frame redirects to the third party URL. Prior to the redirect event, a cookie is created and loaded on to the user's web browser. The cookie may contain any kind of identifiable information about the URL to which the user is to be forwarded after completing a particular action in the third party's website.

According to one embodiment, the entity that controls the third party URL embeds a tracking code into a confirmation page. The tracking code is loaded immediately after a desired action (e.g., clicking on the "OK" button) occurs. The tracking code calls a program that may be residing on the same domain name that initiated the redirect to the third party domain. Once the program is called, it looks for the cookie that was dropped on the user's computer and interprets the parameters (e.g., information including a URL, a log ID, etc.). The process of loading a new website and returning the browser to the original website may occur in a framed environment, as described herein. Alternatively, the closed-loop referral system using a cookie may enable the browser to return to the originally visited website without using frames.

Figure 5:
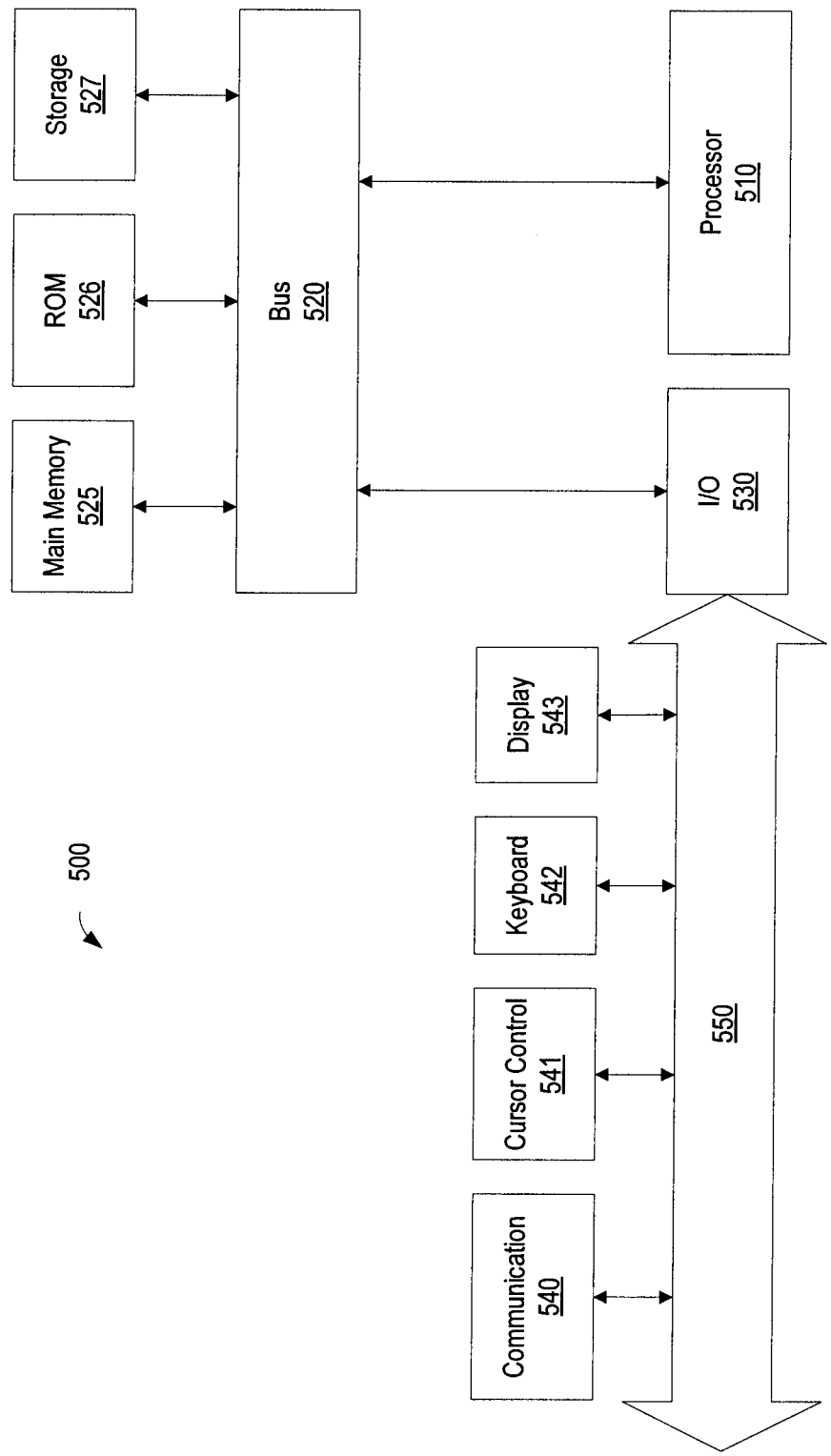
FIG. 5 illustrates an exemplary computer architecture for use with the present system, according to one embodiment.

FIG. 5 illustrates an exemplary computer architecture 500 for use with the present system, according to one embodiment. Computer architecture 500 may be used to implement an online referral system with all or a part of the components shown in FIGS. 2A and 2B. One embodiment of architecture 500 comprises a system bus 520 for communicating information, and a processor 510 coupled to bus 520 for processing information. Architecture 500 further comprises a random access memory (RAM) or other dynamic storage device 525 (referred to herein as main memory), coupled to bus 520 for storing information and instructions to be executed by processor 510. Main memory 525 also may be used for storing temporary variables or other intermediate information during execution of instructions by processor 510. Architecture 500 also may include a read only memory (ROM) and/or other static storage device 526 coupled to bus 520 for storing static information and instructions used by processor 510.

A data storage device 527 such as a flash memory, a magnetic disk or optical disc and its corresponding drive may also be coupled to computer system 500 for storing information and instructions. Architecture 500 can also be coupled to a second I/O bus 550 via an I/O interface 530. A plurality of I/O devices may be coupled to I/O bus 550, including a display device 543, an input device (e.g., an alphanumeric input device 542 and/or a cursor control device 541).

The communication device 540 allows for access to other computers (servers or clients) via a network. The communication device 540 may comprise a modem, a network interface card, a wireless network interface or other well known interface device, such as those used for coupling to Ethernet, token ring, or other types of networks.

A closed loop referral system and method has been described. It is understood that the embodiments described herein are for the purpose of elucidation and should not be considered limiting the subject matter of the present patent. Various modifications, uses, substitutions, combinations, improvements, methods of productions without departing from the scope or spirit of the present invention would be evident to a person skilled in the art.

The invention claimed is:

1. A computer-implemented method, comprising:
   embedding a tracking code into at least one of a first website and a second website;
   directing a browser from the first website to the second website;
   dropping a new cookie, or updating an existing cookie, in a user computer in response to the browser being directed from the first website to the second website, wherein the new or updated cookie comprises identifications of the first and second websites;
   executing the tracking code based on a user action on the second website;
   generating, by a referral system in communication with the tracking code, a URL using the identifications of the first and second websites from the new or updated cookie, wherein the URL is to a third website that is different from the first website and the second website;
   directing, by the referral system, the browser to the third website based on the content of the new or updated cookie; and
   providing customized advertisements to a user of the first website based on a user profile generated by the referral system.

2. The computer-implemented method of claim 1, wherein the first website comprises a frame comprising a link to the second website.

3. The computer-implemented method of claim 1, wherein the first website comprises a clickable web object displayed on a user interface, the clickable web object comprising a link to the second website.

4. The computer-implemented method of claim 1, wherein the user action comprises clicking a button on a confirmation page.

5. The computer-implemented method of claim 1, further comprising calling for a redirection program by the tracking code.

6. The computer-implemented method of claim 1, further comprising providing the identifications of the first and second websites to the tracking code.

7. The computer-implemented method of claim 1, wherein the new or updated cookie further comprises a parameter comprising one of a site name, a frame log ID, a campaign ID, or a partner ID.

8. The computer-implemented method of claim 6, wherein the new or updated cookie further comprises a parameter comprising one of a site name, a frame log ID, a campaign ID, or a partner ID.

9. A non-transitory computer-readable storage medium storing computer-readable instructions which, when executed by a system, cause the system to perform:
   embedding a tracking code into at least one of a first website and a second website;
   directing a browser from the first website to the second website;

dropping a new cookie, or updating an existing cookie, in a user computer in response to the browser being directed from the first website to the second website, wherein the new or updated cookie comprises identifications of the first and second websites;

executing the tracking code based on a user action on the second website;

generating, by a referral system in communication with the tracking code, a URL using the identifications of the first and second websites from the new or updated cookie, wherein the URL is to a third website that is different from the first website and the second website;

directing, by the referral system, the browser to the third website based on the content of the new or updated cookie; and providing customized advertisements to a user of the first website based on a user profile generated by the referral system.

10. The non-transitory computer-readable storage medium of claim 9, wherein the first website comprises a frame comprising a link to the second website.

11. The non-transitory computer-readable storage medium of claim 9, wherein the first website comprises a clickable web object displayed on a user interface, the clickable web object comprising a link to the second website.

12. The non-transitory computer-readable storage medium of claim 9, wherein the user action comprises clicking a button on a confirmation page.

13. The non-transitory computer-readable storage medium of claim 9, further comprising calling for a redirection program by the tracking code.

14. The non-transitory computer-readable storage medium of claim 9, further comprising providing the identifications of the first and second websites to the tracking code.

15. The non-transitory computer-readable storage medium of claim 9, wherein the new or updated cookie further comprises a parameter comprising one of a site name, a frame log ID, a campaign ID, or a partner ID.

16. The non-transitory computer-readable storage medium of claim 14, wherein the new or updated cookie further comprises a parameter comprising one of a site name, a frame log ID, a campaign ID, or a partner ID.

17. A system comprising:
a computing device configured to:
embed a tracking code into at least one of a first website and a second website;
direct a browser from the first website to the second website;
drop a new cookie, or update an existing cookie, in a user computer in response to the browser being directed from the first website to the second website, wherein the new or updated cookie comprises identifications of the first and second websites; and
execute the tracking code based on a user action on the second website;
generate, by a referral system in communication with the tracking code, a URL using the identifications of the first and second websites from the new or updated cookie, wherein the URL is to a third website that is different from the first website and the second website;
direct, by the referral system, the browser to the third website based on the content of the new or updated cookie; and
provide customized advertisements to a user of the first website based on a user profile generated by the referral system.

* * * * *